W. FIFIELD.
NUT LOCK.
APPLICATION FILED MAR. 23, 1909.

972,758.

Patented Oct. 11, 1910.

WITNESSES:
Thos. W. Riley
W. J. Jacobi

INVENTOR
W. Fifield
BY
W. J. FitzGerald & Co.
Attorneys

UNITED STATES PATENT OFFICE.

WARREN FIFIELD, OF SAUK RAPIDS, MINNESOTA, ASSIGNOR OF ONE-THIRD TO A. J. WEBER, OF CASTLE ROCK, WASHINGTON.

NUT-LOCK.

972,758.      Specification of Letters Patent.      Patented Oct. 11, 1910.

Application filed March 23, 1909. Serial No. 485,256.

*To all whom it may concern:*

Be it known that I, WARREN FIFIELD, a citizen of the United States, residing at Sauk Rapids, in the county of Benton and State of Minnesota, have invented certain new and useful Improvements in Nut-Locks; and I do hereby declare the following to be a full, clear, and exact description of the invention, such as will enable others skilled in the art to which it appertains to make and use the same.

My invention relates to a new and useful improvement in nut locks and my object is to provide means for securely locking a nut on a bolt.

A further object is to form the bolt so that the same may be manually released when it is desired to remove the nut.

A further object is to provide retaining means on the nut for the locking pin.

Other objects and advantages will be hereinafter referred to and more particularly pointed out in the claims.

Figure 1:
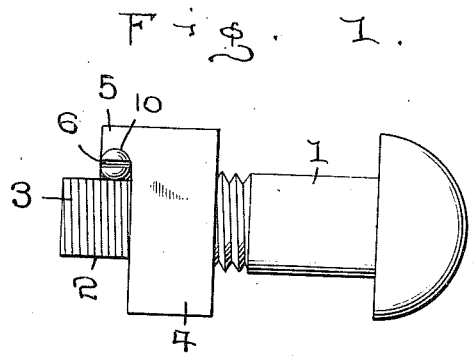
Figure 2:
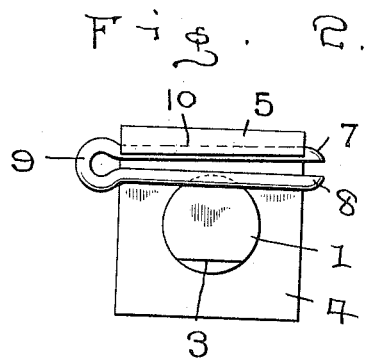
Figure 3:
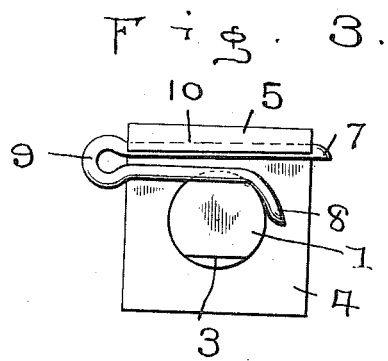

In the accompanying drawings forming part of this application, Figure 1 is a side elevation of a bolt showing the nut thereon in locked position. Fig. 2 is an end elevation thereof. Fig. 3 is an end elevation of the same showing one arm of the locking pin bent in engagement with the bolt.

Referring to the drawings in which similar reference numerals designate corresponding parts throughout the several views, 1 indicates a bolt, one end of which is provided with the usual form of threads 2, portions of said threads on opposite sides of the bolt being removed to form flattened portions or seats 3.

Adapted to take onto the threaded portion of the bolt 1 is a nut 4, on the forward face of which is provided a rib 5, said rib extending across the front face of the nut, between which and the seats 3 on the bolt, is adapted to be introduced a locking pin 6. The locking pin 6 preferably consists of a split key or cotter pin, the arms 7 and 8 of which are normally spread apart by the spring tension of the connecting head 9, so that when the locking pin is introduced between the bolt and the rib on the nut, spring tension will be exerted on the arms and hold the same in close relationship with the rib and bolt, respectively, the lower face of the rib being provided with a curved channel 10, which engages the curved face of the arms 7 and 8 and holds the pin against moving edge-wise from below the rib, while the pin is held normally against longitudinal movement by inclining the channel 10, from that end of the rib which is engaged by the head 9 to the opposite end of the channel.

After the locking pin has been properly seated, the free end of the arm 8 may be forced downwardly as best shown by dotted lines in Fig. 2, thereby securely locking the pin in position between the bolt and rib.

At such time as it is desired to remove the nut from the bolt, or re-adjust the same the bent-down portion may be straightened and the pin driven lengthwise from between the rib and bolt, when the nut may be readily turned to remove the same from the bolt or tightened as occasion may require.

What I claim is:

1. A device of the character described, comprising a bolt having a mutilated threaded portion, said portion having flattened surfaces thereon removing complete segments from said bolt, a nut applied to said bolt having a transverse rib projecting from the upper edge of one of its faces and a bifurcated spring pin inserted between said projecting rib and one of said flattened surfaces, the under face of said projecting rib being concaved to form a channel and said channel inclined from one edge to the opposite side edge of said nut, whereby longitudinal and lateral movement of said spring pin is prevented.

2. A device of the character described, comprising a bolt having a mutilated thread portion thereon, said portion having segments cut therefrom to form flattened portions thereon, a nut applied to said bolt having a transverse rib projecting from the upper edge of the forward face thereof, the under face of said projecting rib being concaved to form a channel and a bifurcated spring pin having a head thereon inserted between said rib and a flattened portion of said bolt, the arms of said pin conforming in outline to the curvature of said channel and said head engaging one end of said rib, said channel being inclined from that end of the rib engaged by said head to the opposite end of the channel, whereby longitudinal and lateral movement of said spring pin is prevented.

In testimony whereof I have signed my name to this specification in the presence of two subscribing witnesses.

WARREN FIFIELD.

Witnesses:
 THOMAS VAN ETTEN,
 HARRY GRIMNSER.